United States Patent [19]

McGee et al.

[11] Patent Number: 4,852,825
[45] Date of Patent: Aug. 1, 1989

[54] EXTRACTION AND INSERTION MECHANISM FOR A LEADER BLOCK OF A TAPE CARTRIDGE

[75] Inventors: Jeffrey S. McGee, San Diego; Thomas C. Kadien, Vista, both of Calif.

[73] Assignee: Cipher Data Products, Inc., San Diego, Calif.

[21] Appl. No.: 244,694

[22] Filed: Sep. 14, 1988

[51] Int. Cl.$^4$ ............................................. G11B 15/66
[52] U.S. Cl. .................................................... 242/195
[58] Field of Search ................... 242/195, 197; 226/92, 226/91; 360/95, 93

[56] References Cited

U.S. PATENT DOCUMENTS

| | | | |
|---|---|---|---|
| 4,334,656 | 6/1982 | Crawford et al. | 242/195 |
| 4,335,858 | 6/1982 | Cranna | 242/195 |
| 4,399,936 | 8/1983 | Rueger | 226/92 |
| 4,477,851 | 10/1984 | Dalziel et al. | 360/95 |
| 4,608,614 | 8/1986 | Rinkleib et al. | 360/95 |
| 4,646,177 | 2/1987 | Sanford et al. | 360/95 |
| 4,679,747 | 7/1987 | Smith | 242/195 |
| 4,681,278 | 7/1987 | Smith | 242/195 |
| 4,704,645 | 11/1987 | Murphy et al. | 360/95 |
| 4,742,407 | 5/1988 | Smith et al. | 360/95 |
| 4,787,570 | 11/1988 | Nakagome | 242/195 |

Primary Examiner—David Werner
Attorney, Agent, or Firm—Baker, Maxham, Jester & Meador

[57] ABSTRACT

A tape transport for a leader block tape cartridge has a threading mechanism including a threader pin for engaging the leader block and extracting it from the cartridge after it has been loaded into the transport adjacent a first end of a tape path. The threading mechanism pulls the leader block along the tape path past a read/write head, and inserts the leader block into a take-up hub adjacent a second end of the tape path during a threading operation. During a rewinding operation, the threading mechanism extracts the leader block from the take-up hub, pulls the leader block past the read/write head and inserts the leader block back into the cartridge. A first guide assembly adjacent the first end of the tape path engages and guides the leader block to ensure proper insertion thereof back into the cartridge during the rewinding operation. A second guide assembly adjacent the second end of the tape path engages and guides the leader block to ensure proper insertion thereof into the take-up hub during the threading operation. This accommodates the tolerance variations in the positions of the cartridge and take-up hub, and in the dimensions of the cartridge, leader block, take-up hub and threader pin which can otherwise lead to failures in the automatic insertion of the leader block into the cartridge and/or take-up hub.

6 Claims, 4 Drawing Sheets

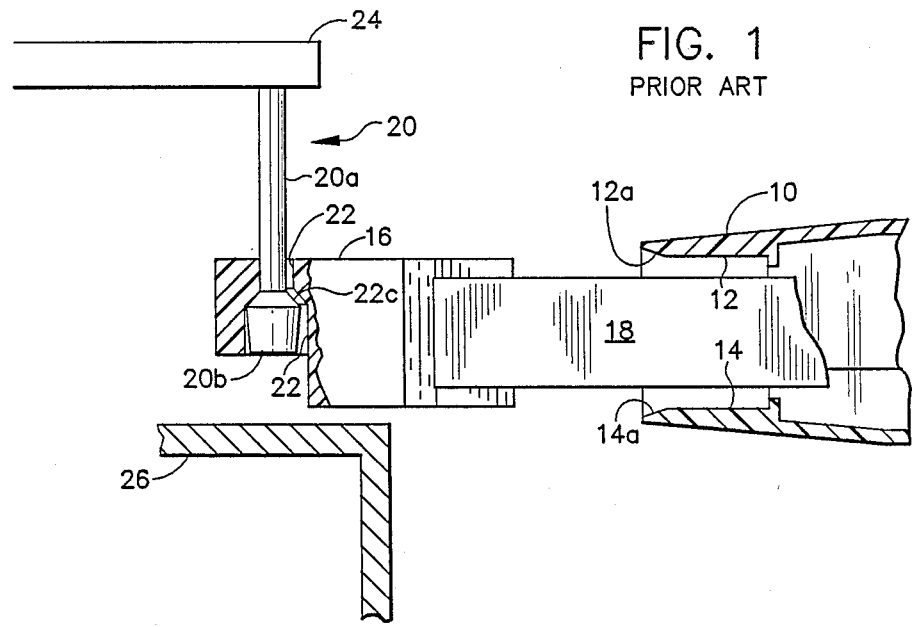
FIG. 1
PRIOR ART
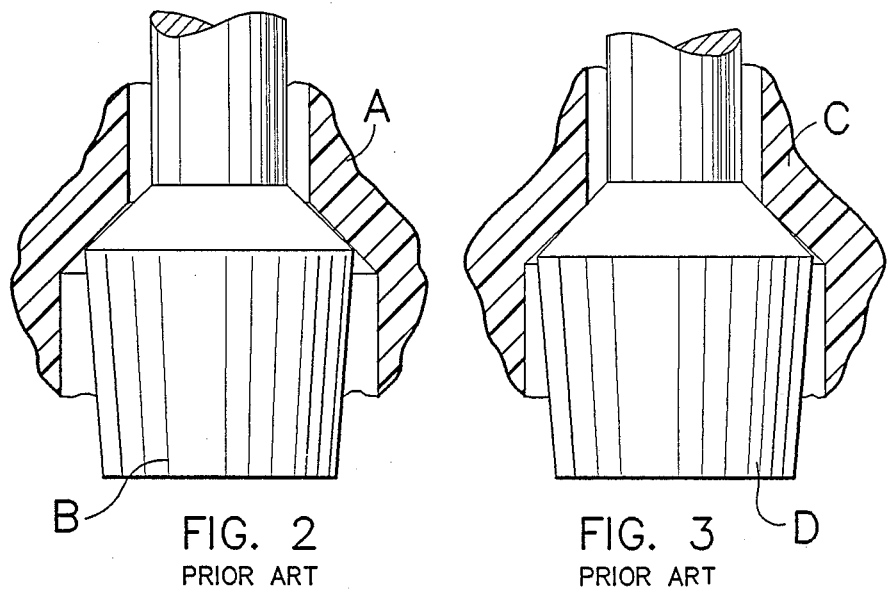
FIG. 2
PRIOR ART
FIG. 3
PRIOR ART

EXTRACTION AND INSERTION MECHANISM FOR A LEADER BLOCK OF A TAPE CARTRIDGE

BACKGROUND OF THE INVENTION

The present invention relates to magnetic tape transports, and more particularly, to a mechanism for insuring proper extraction and insertion of a leader block of a tape cartridge with respect to both the cartridge housing and the take-up hub.

One magnetic tape cartridge particularly suited for storing digital data is defined in Proposed American National Standard (ANSI) X3B5/87-238. This tape cartridge contains a single reel of magnetic tape including a leader block for interfacing with an automatic threading system and is hereafter referred to as the "leader block tape cartridge." This cartridge is further illustrated and described in U.S. Pat. Nos. 4,335,858; 4,334,656; 4,383,660 and 4,452,406.

A number of tape transports have been developed that utilize the aforementioned leader block tape cartridge. One example is the IBM (Trademark) 3480 tap transport. FIG. 1 of the drawings herein illustrates a conventional mechanism for extracting the leader block, threading the tape and re-inserting the leader block back into the tape cartridge. A fragmentary, vertical section of the corner of the housing of the leader block tape cartridge is denoted with the reference numeral 10. This corner of the tape cartridge has a receptacle defined by upper and lower walls 12 and 14 for removably receiving the leader block 16 therein. This leader block is connected to the terminal end of a length of half-inch magnetic tape 18 wound about a supply reel (not illustrated) within the cartridge housing. Heretofore, each tape transport for the leader block tape cartridge has utilized a threader pin such as 20 whose narrow upper portion 20a is received in the smaller upper portion of a cylindrical aperture 22 formed in the leader block 16 upon insertion of the cartridge into the drive. The pin or cartridge is then moved vertically so that its enlarged lower portion 20b is captured in the lower enlarged portion of the aperture 22 in the leader block. Thereafter the threader pin is moved horizontally by a rotating arm such as 24 or a guide belt to pull the leader block and the tape connected thereto along a tape path (not shown) until the leader block is received in a slot formed in a take-up hub (not shown). The read/write head and take-up hub (neither illustrated in FIG. 1) are positioned above a horizontal deck plate 26 which typically forms a part of the frame of the tape drive.

One example of a leader block extraction, threading and insertion mechanism of the foregoing type is disclosed in U.S. Pat. No. 4,704,645 assigned to Cipher Data Products, Inc. See also U.S. Pat. Nos. 4,334,656; 4,335,858; 4,399,936; and 4,608,614 assigned to IBM, 4,679,747 assigned to Laser Magnetic Storage International Company and 4,742,407 assigned to Aspen Peripherals for further examples. Similar extracting, threading, and insertion arrangements for tape cartridges analogous to the leader block tape cartridge are shown in U.S. Pat. Nos. 4,477,851 and 4,646,177.

Problems have occurred with tape transports heretofore developed for the leader block tape cartridge with regard to reliable extraction and insertion of the leader block. The leader block must be extracted from the cartridge and properly inserted into the take-up hub before data can be written onto the tape and read therefrom. When the user thereafter desires to remove the tape cartridge, the leader block must be extracted from the take-up hub and then inserted into the cartridge. The positioning of the leader block must be very precise or else the insertion routines can fail. Such a failure will render the tape drive unusable for data storage and retrieval on that particular cartridge and will typically result in an expensive service call.

The foregoing problems arise from the following. The leader block 16 is relatively large and has sharp, right angle surfaces. While the walls of the leader block receptacle are tapered at 12a and 14a (FIG. 1), analysis has indicated that there is only a cumulative vertical tolerance of approximately 0.032 inches available to insure proper insertion of the leader block back into the receptacle in the corner 10 of the cartridge housing according to aforementioned proposed ANSI specification. It is apparent that if the leader block is slightly too high or too low, it will strike the forward edges of the receptacle and will not be guided into the receptacle by the tapered edges 12a and 14a. The very narrow tolerance is due in part to variations in the sizes of the leader block and the cartridge housing which are both molded of plastic material.

Heretofore it has been assumed that the tapered shoulder 22c of the threader arm would establish the height of the leader block 16 supported thereby to insure proper re-insertion. However, experience has shown this is not true because of the tolerance variations in the size of the threader pin and in the size of the aperture in the leader block. Referring to FIG. 2, leader block A has the largest aperture permissible under the ANSI standard while threader pin B is the smallest permissible under the standard. Referring to FIG. 3, leader block C has the smallest aperture permissible under the ANSI standard while threader pin D is the largest permissible under the standard. By comparing these worst case scenarios resulting from the tolerance extremes under the aforementioned ANSI standard, is readily apparent that there can be an accumulated tolerance of 0.0144 plus or minus 0.0074 inches resulting from the fabrication of the threader pin and the leader block which is in addition to another plus or minus 0.018 inches tolerance from the bottom of the leader block to the shoulder. These accumulated tolerances exceed the aforementioned vertical tolerance of 0.032 inches and lead to problems in reliably extracting the leader block from the cartridge housing and inserting the leader block back into the cartridge housing. Similar problems are experienced with regard to insertion of the leader block into the take-up hub and extraction of the leader block from the take-up hub. The cartridge uses all the available tolerance leaving none for other components (i.e. threader pin shoulder height or cartridge opening vertical placement).

Another implementation has attempted to solve the leader block extraction and insertion problem by using a threader pin whose height can be adjusted relative to its moveable support via screw threads. However, this approach requires precise factory adjustment and still doesn't adequately overcome the failures.

SUMMARY OF THE INVENTION

It is therefore the primary object of the present invention to provide an improved leader block extraction and insertion mechanisms for a tape drive.

According to the present invention a tape transport for a leader block tape cartridge has a threading mechanism including a threader pin for engaging and the leader block and extracting it from the cartridge after it has been loaded into the transport adjacent a first end of a tape path. The threading mechanism pulls the leader block along the tape path past a read/write head, and inserts the leader block into a take-up hub adjacent a second end of the tape path during a threading operation. During a rewinding operation, the threading mechanism extracts the leader block from the take-up hub, pulls the leader block past the read/write head and inserts the leader block back into the cartridge. A first guide assembly adjacent the first end of the tape path engages and guides the leader block to ensure proper insertion thereof back into the cartridge during the rewinding operation. A second guide assembly adjacent the second end of the tape path engages and guides the leader block to ensure proper insertion thereof into the take-up hub during the threading operation. This accommodates the tolerance variations in the positions of the cartridge and take-up hub, and in the dimensions of the cartridge, leader block, take-up hub and threader pin which can otherwise lead to failures in the automatic insertion of the leader block into the cartridge and/or take-up hub.

In the illustrated embodiment of our invention, the first and second guide assemblies each include a friction pad mounted on a horizontal deck plate of the transport and a spring member mounted to a frame of the transport above the friction pad. The leader block is pulled between the friction pad and the spring member of each guide assembly with the leader block engaging the friction pad on a lower side thereof and engaging and deflecting the spring member on an upper side thereof. The spring members of the first and second guide assemblies are provided by the opposite terminal ends of a resilient, flexible keeper plate mounted to the frame in spaced relationship from the deck plate.

BRIEF DESCRIPTION OF THE DRAWINGS

FIG. 1 illustrates a conventional mechanism for extracting the leader block, threading the tape and reinserting the leader block back into the tape cartridge.

FIG. 2 is an enlarged, fragmentary vertical sectional view of a leader block having the largest aperture permissible under the ANSI standard with the smallest permissible threader pin shown in elevation captured therein.

FIG. 3 is an enlarged, fragmentary vertical sectional view of a leader block having the smallest aperture permissible under the ANSI standard with the largest permissible threader pin shown in elevation captured therein.

DESCRIPTION OF THE PREFERRED EMBODIMENT

Figure 4:
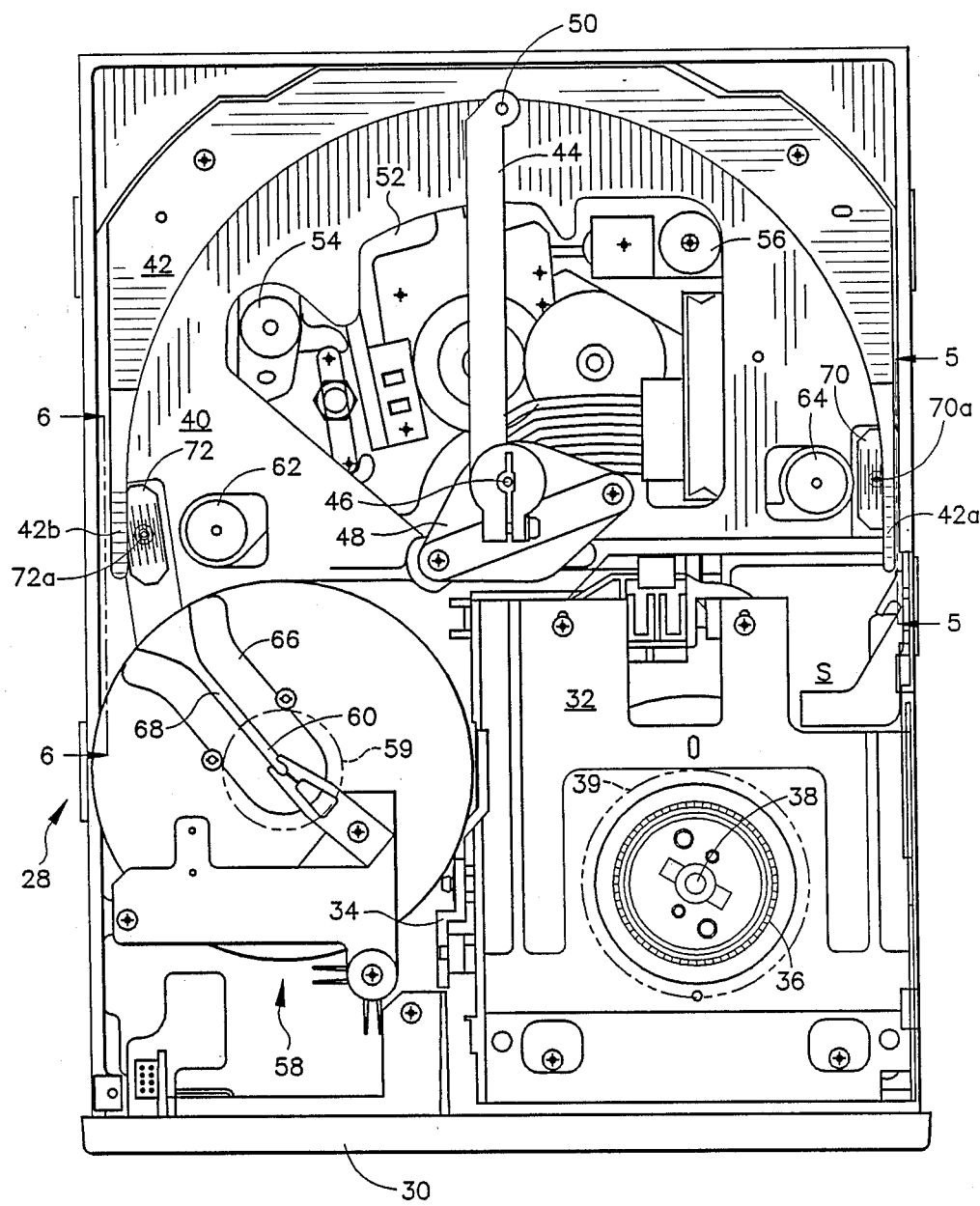
FIG. 4 is a plan view of a tape transport embodying a preferred embodiment of the present invention.

Referring to FIG. 4, a tape transport constructed in accordance with the present invention has a rectangular frame 28 dimensioned to fit the computer industry standard eight-inch form factor. The frame 28 has a front panel 30 connected to the forward transverse end of the frame. The front panel has a slot or bezel (not visible) for receiving therethrough a leader block tape cartridge not illustrated in this figure. The cartridge is slid horizontally into a carriage 32 which thereafter swings downwardly via linkage 34 to engage the serrated supply reel hub (not illustrated) of the cartridge with a toothed drive chuck 36. The drive chuck is secured to the upper end of a vertical shaft 38 of a first brushless DC motor 39 (illustrated in phantom lines) which is mounted to the frame beneath the carriage.

Continuing with FIG. 4, the rear half of the tape transport has a horizontal deck plate 40 above which is mounted an arcuate or C-shaped horizontal keeper plate 42. The keeper plate is made of a resilient flexible material such as plastic or metal. The keeper plate is generally planar in configuration and is mounted parallel to the deck plate, in spaced relation therefrom. A threader arm 44 has its inner end rigidly coupled to a vertical drive shaft 46 which is rotated by motor 48 mounted to the tape transport frame. The upper end of a threader pin 50 of the type illustrated in FIGS. 1, 2 and 3 is connected to the outer end of the threader arm 44 and extends downwardly from the same. A read/write head 52 is mounted above the deck plate between a pair of tape guide rollers 54 and 56. A take-up reel 58 is mounted to the upper end of a vertical shaft of a second brushless DC motor 59 (illustrated in phantom lines) which is mounted to the frame. The take-up reel includes a central take-up hub defining a receptacle 60 for receiving the leader block. A tape guide roller 62 is positioned along the tape path adjacent the periphery of the take-up reel 58. Another tape guide roller 64 is positioned adjacent the take-up reel and the right rear corner of the carriage 32 at the location of the corner of the tape cartridge where the tape leader block seats.

The loading sequence of the tape drive of FIG. 4 is as follows. The outer end of the threader arm 44 is initially located so that the threader pin 50 is at the position marked with the S. The leader block cartridge is inserted into the tape drive and is received in carriage 32 so that the angled corner thereof with the leader block seated therein approaches the threader pin at location S. The height of the carriage is initially such that the narrower portion of the threader pin is received in the aperture in the leader block, while the enlarged portion is below the leader block. Continued pushing in of the cartridge results in full capture of the narrow upper portion of the threader pin into the aperture in the leader block. The carriage 32 is then lowered to capture the enlarged lower portion or shoulder of the threader pin into the enlarged portion of the aperture in the leader block. During a threading operation of the tape drive, the threader arm 44 is then rotated counter-clockwise to pull the leader block, and the tape connected thereto around the tape guide rollers 64 and 56, past the read/write head 52, around the tape guide rollers 54 and 62 to the take-up reel 58.

A guide 66 mounted to the upper end of the take-up hub defines a slot 68 for receiving the upper portion of the threader pin. During the threading operation the take-up reel 58 and its guide 66 are stopped in the angular position illustrated in FIG. 4. The threader arm can then pull the leader block into the receptacle 60 in the take-up hub. The take-up reel can thereafter be rotated to wind the magnetic tape about the take-up hub 60, during which the leader block spins about the threader pin whose axis now coincides with the axis of rotation of the take-up reel.

During a rewinding operation, all of the magnetic tape is unwound off of the take-up hub 60 and the hub is stopped with the guide 66 in the angular location illustrated in FIG. 4. The threader arm 44 is then rotated clockwise to pull the leader block, and the tape connected thereto, out of the receptacle 60 in the take-up hub, back around the guide rollers 62 and 54, past the read/write head 52, and then past the guide rollers 56 and 64. The leader block is then re-inserted back into the corner of the tape cartridge.

Figure 5:
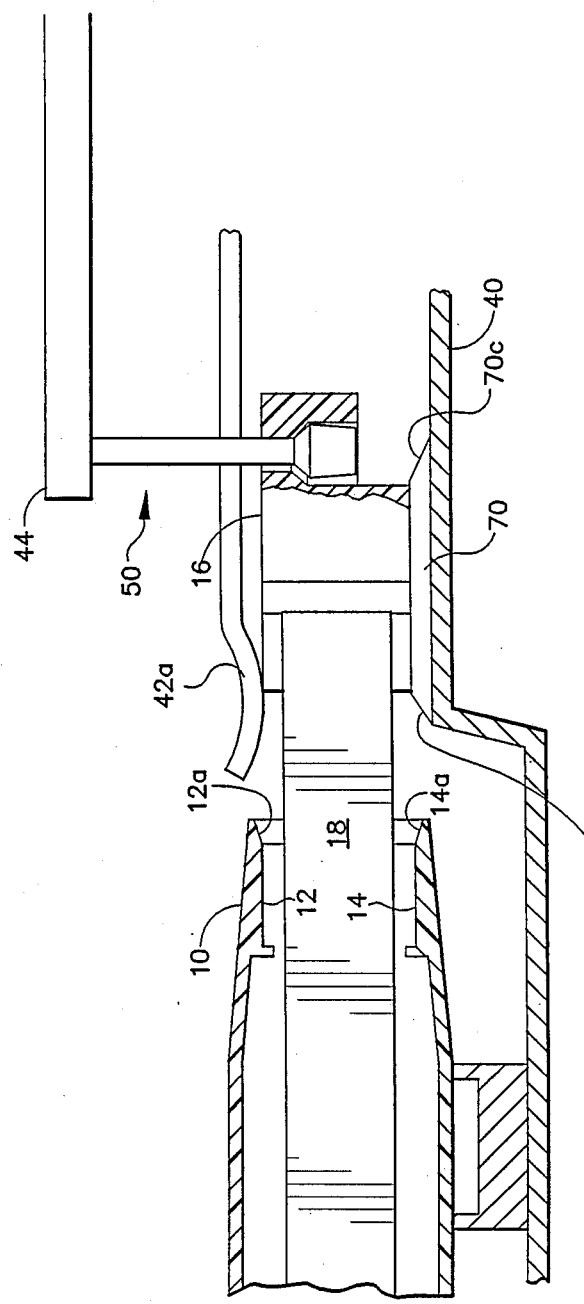
FIG. 5 is an enlarged fragmentary vertical sectional view taken along line 5—5 of FIG. 4 illustrating the insertion of the leader block back into a leader block tape cartridge which has been loaded into the tape transport of FIG. 4.

The present invention provides first guide means connected to the frame adjacent the cartridge for engaging and guiding the leader block to ensure proper insertion thereof back into the cartridge during the rewinding operation. Optionally, the present invention further provides second guide means connected to the frame adjacent the take-up hub for engaging and guiding the leader block to ensure proper insertion thereof into the take-up hub during the threading operation. Referring to FIG. 4, in the illustrated embodiment of the invention the first and second guide means include friction pads 70 and 72 mounted on the deck plate 40. Spring members 42a and 42b are mounted to the frame and spaced from the friction pads 70 and 72, respectively, so that the leader block is pulled between each friction pad and its corresponding spring member. As best seen in FIG. 5, the leader block 16 engages the friction pad on a first side thereof and engages and deflects and the adjacent spring member on a second side thereof. The spring members of the first and second guide means each have an outer end which curves away from the deck plate. In the illustrated embodiment, the spring members 42a and 42b are provided by the opposite terminal ends of the resilient, flexible keeper plate 42 which is mounted to the frame in spaced relationship from the deck plate.

Figure 6:
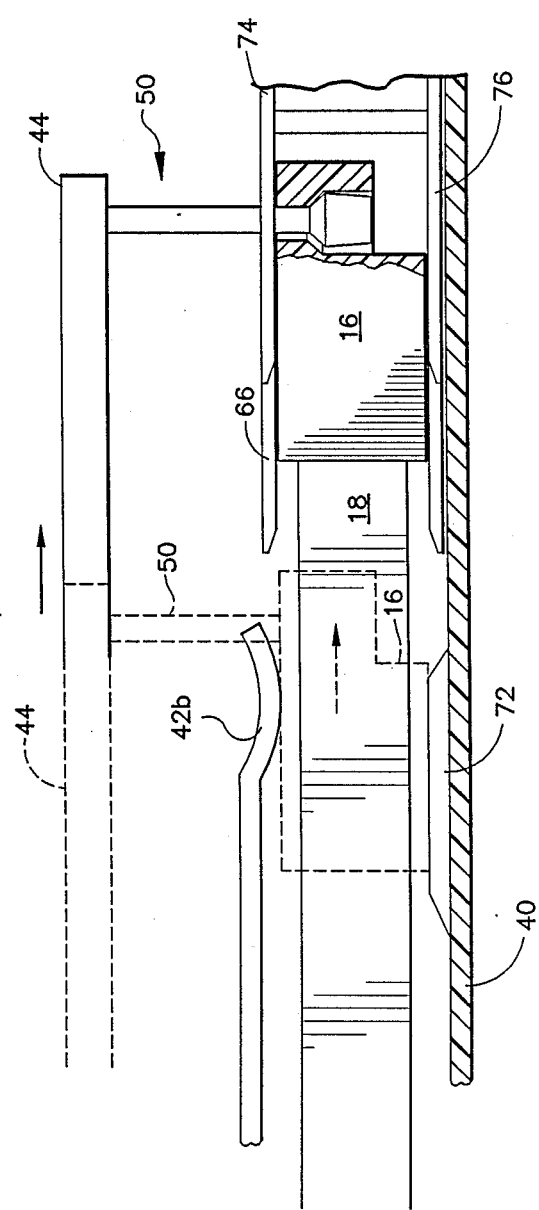
FIG. 6 is an enlarged fragmentary vertical sectional view taken along line 6—6 of FIG. 4 illustrating the insertion of the leader block into the take-up hub of the tape transport. Successive positions of the threader arm and leader block are shown in phantom lines and in solid lines, respectively.

The friction pads 70 and 72 are mounted to the upper surface of the deck plate 40 by screws 70a and 72a (FIG. 4). Alternatively, the friction pads may be raised integral portions of a die cast deck plate which are later machined down to achieve the precise height required. As illustrated by the vertical lines in FIG. 4, the friction pads may have parallel serrations or grooves formed therein primarily for aesthetic reasons, i.e. they will continue to appear shiny even after repeated engagement and wear from the leader block. As best seen in FIG. 5, preferably the leading and trailing edges of the friction pads are beveled at 70b and 70c to provide a smooth guiding action between the pad and the adjacent spring member. The combination of spring member 42a and friction pad 70 is positioned near the corner of the tape cartridge having the leader block when the cartridge is first inserted into the drive into carriage 32. This spatial relationship is visible in FIGS. 4 and 5. The combination of spring member 42b and friction pad 72 is positioned adjacent the outer periphery of the take-up reel 58 for guiding the leader block between the upper and lower reel flanges 74 and 76 (FIG. 6) and into the receptacle 60 in the take-up hub of this reel. Successive positions of the threader arm 44, threader pin 50 and leader block 16 during the threading operation are shown in phantom and then solid lines in FIG. 6.

While we have described several preferred embodiments of our leader block extraction and insertion mechanism, it should be understood that modifications and adaptations thereof will occur to persons skilled in the art. Therefore, the protection afforded our invention should only be limited in accordance with the scope of the following claims.

We claim:

1. A transport for a leader block tape cartridge, comprising:
   a generally rectangular frame including a deck plate;
   means for receiving and supporting the cartridge within the frame;
   a supply reel motor mounted to the frame;
   first drive means connected to the supply reel motor and engageable with a supply reel inside the cartridge for rotating the same;
   a take-up motor mounted to the frame;
   a take-up hub;
   second drive means connected to the take-up motor for rotating the take-up hub;
   a magnetic tape transducer assembly mounted to the frame between the take-up hub and the cartridge when the cartridge is inserted in the frame; and
   tape threading means for extracting a leader block from the cartridge, pulling the leader block adjacent the deck plate past the transducer assembly, and inserting the leader block into the take-up hub during a threading operation, and for extracting the leader block from the take-up hub, pulling the leader block past the transducer assembly and inserting the leader block into the cartridge during a rewinding operation, including first guide means connected to the frame adjacent the cartridge supporting means for engaging and guiding the leader block to ensure proper insertion thereof back into the cartridge during the rewinding operation and second guide means connected to the frame adjacent the take-up hub for engaging and guiding the leader block to ensure proper insertion thereof into the take-up hub during the threading operation, the first and second guide means each including a friction pad mounted on the deck plate and a spring member mounted to the frame and spaced from the friction pad so that the leader block is pulled between the friction pad and the spring member with the leader block engaging the friction pad on a first side thereof and engaging and deflecting and the spring member on a second side thereof.

2. A transport according to claim 1 wherein the spring members of the first and second guide means each have an outer end which curves away from the deck plate.

3. A transport according to claim 1 wherein the spring members are provided by the opposite terminal ends of a resilient, flexible keeper plate mounted to the frame in spaced relationship from the deck plate.

4. A transport for a leader block tape cartridge, comprising:
   a generally rectangular frame including a horizontal deck plate defining a tape path;
   a carriage for receiving and supporting the cartridge within the frame adjacent a first end of the tape path;
   a supply reel motor mounted to the frame beneath the carriage;

a drive chuck connected to a shaft of the supply reel motor and engageable with a supply reel inside the cartridge for rotating the same when the cartridge is received in the carriage;

a take-up motor mounted to the frame;

a take-up hub connected to a shaft of the take-up motor adjacent a second end of the tape path;

a read/write head mounted above deck plate between the first and second ends of the tape path;

a threading mechanism including a threader pin for engaging the leader block and extracting it from the cartridge, pulling the leader block along the tape path past the read/write head, and inserting the leader block into the take-up hub during a threading operation, and for extracting the leader block from the take-up hub, pulling the leader block past the read/write head and inserting the leader block into the cartridge during a rewinding operation, including a first guide assembly connected to the frame adjacent the first end of the tape path for engaging and guiding the leader block to ensure proper insertion thereof back into the cartridge during the rewinding operation and a second guide assembly connected to the frame adjacent the second end of the tape path for engaging and guiding the leader block to ensure proper insertion thereof into the take-up hub during the threading operation, the first and second guide assemblies each including a friction pad mounted on the deck plate and a spring member mounted to the frame above the friction pad so that the leader block is pulled between the friction pad and the spring member with the leader block engaging the friction pad on a lower side thereof and engaging and deflecting and the spring member on an upper side thereof.

5. A transport according to claim 4 wherein the spring members of the first and second guide assemblies each have an outer end which curves away from the deck plate.

6. A transport according to claim 4 wherein the spring embers are provided by the opposite terminal ends of a resilient, flexible keeper plate mounted to the frame in spaced relationship from the deck plate.

* * * * *